(12) United States Patent
Washington

(10) Patent No.: US 9,243,762 B1
(45) Date of Patent: Jan. 26, 2016

(54) VEHICLE SAFETY LIGHT DEVICE

(71) Applicant: Tony B. Washington, Merrillville, IN (US)

(72) Inventor: Tony B. Washington, Merrillville, IN (US)

( * ) Notice: Subject to any disclaimer, the term of this patent is extended or adjusted under 35 U.S.C. 154(b) by 121 days.

(21) Appl. No.: 14/096,462

(22) Filed: Dec. 4, 2013

(51) Int. Cl.
*F21L 4/02* (2006.01)

(52) U.S. Cl.
CPC .................................. *F21L 4/02* (2013.01)

(58) Field of Classification Search
CPC ........... B60Q 1/34; B60Q 1/442; G08B 21/00
USPC .................................................. 362/499, 486
See application file for complete search history.

(56) References Cited

U.S. PATENT DOCUMENTS

| | | | |
|---|---|---|---|
| 3,947,677 A | 3/1976 | Steinle | |
| 4,257,088 A | 3/1981 | Kimmel | |
| D274,001 S | 5/1984 | Sailers | |
| 4,590,543 A | 5/1986 | Chen | |
| 4,782,432 A | 11/1988 | Coffman | |
| 6,866,406 B1 * | 3/2005 | Starkey et al. | 362/501 |
| D506,942 S | 7/2005 | Leung et al. | |
| 6,945,679 B2 * | 9/2005 | Young | 362/500 |
| 7,264,371 B1 * | 9/2007 | Seagriff | 362/156 |
| 7,296,908 B1 * | 11/2007 | Pickard et al. | 362/183 |
| 7,370,989 B2 * | 5/2008 | Bayat et al. | 362/186 |
| 7,540,640 B2 * | 6/2009 | Lin | 362/485 |
| 7,581,857 B1 * | 9/2009 | Sisko | 362/485 |
| 7,670,023 B1 * | 3/2010 | Peterson | 362/183 |
| 7,798,509 B2 * | 9/2010 | Ohzono | 280/152.05 |
| 7,871,188 B1 * | 1/2011 | Turby | 362/473 |
| 7,878,678 B1 * | 2/2011 | Stamatatos et al. | 362/184 |
| 7,944,344 B2 * | 5/2011 | Chen | 340/432 |
| 8,104,939 B2 * | 1/2012 | Coushaine et al. | 362/511 |
| 8,246,193 B2 * | 8/2012 | Weng | 362/183 |
| 8,382,317 B1 * | 2/2013 | Baker | 362/225 |
| 8,439,535 B2 * | 5/2013 | Yu | 362/497 |
| 8,833,985 B2 * | 9/2014 | Robertson et al. | 362/486 |
| 8,899,805 B2 * | 12/2014 | Helterbrand et al. | 362/541 |
| 2003/0189836 A1 * | 10/2003 | Sparling et al. | 362/485 |
| 2004/0100372 A1 | 5/2004 | Yang | |
| 2004/0114391 A1 * | 6/2004 | Watkins et al. | 362/542 |
| 2004/0165399 A1 * | 8/2004 | Menke | 362/499 |

* cited by examiner

*Primary Examiner* — Ali Alavi

(57) ABSTRACT

A vehicle safety light device for illuminating a portion of a vehicle and providing simultaneous illumination to the front and rear as a warning. The device includes a main housing and a front light coupled to and exposed through a front face of a perimeter wall of the main housing. The front light is selectively illuminated. An electrical port is coupled to a rear face of the main housing. A cord has a first end selectively couplable to the electrical port. A secondary light is coupled to and exposed through a front face of a secondary housing. A second end of the cord is coupled to the secondary housing. The cord is electrically coupled to the front light wherein the secondary light is illuminated when the cord is coupled to the electrical port and the front light is illuminated.

10 Claims, 5 Drawing Sheets

VEHICLE SAFETY LIGHT DEVICE

BACKGROUND OF THE DISCLOSURE

Field of the Disclosure

The disclosure relates to safety light devices and more particularly pertains to a new safety light device for illuminating a portion of a vehicle and providing simultaneous illumination to the front and rear as a warning.

SUMMARY OF THE DISCLOSURE

An embodiment of the disclosure meets the needs presented above by generally comprising a main housing and a front light coupled to and exposed through a front face of a perimeter wall of the main housing. The front light is selectively illuminated. An electrical port is coupled to a rear face of the main housing. A cord has a first end selectively couplable to the electrical port. A secondary light is coupled to and exposed through a front face of a secondary housing. A second end of the cord is coupled to the secondary housing. The cord is electrically coupled to the front light wherein the secondary light is illuminated when the cord is coupled to the electrical port and the front light is illuminated.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF THE DRAWINGS

The disclosure will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
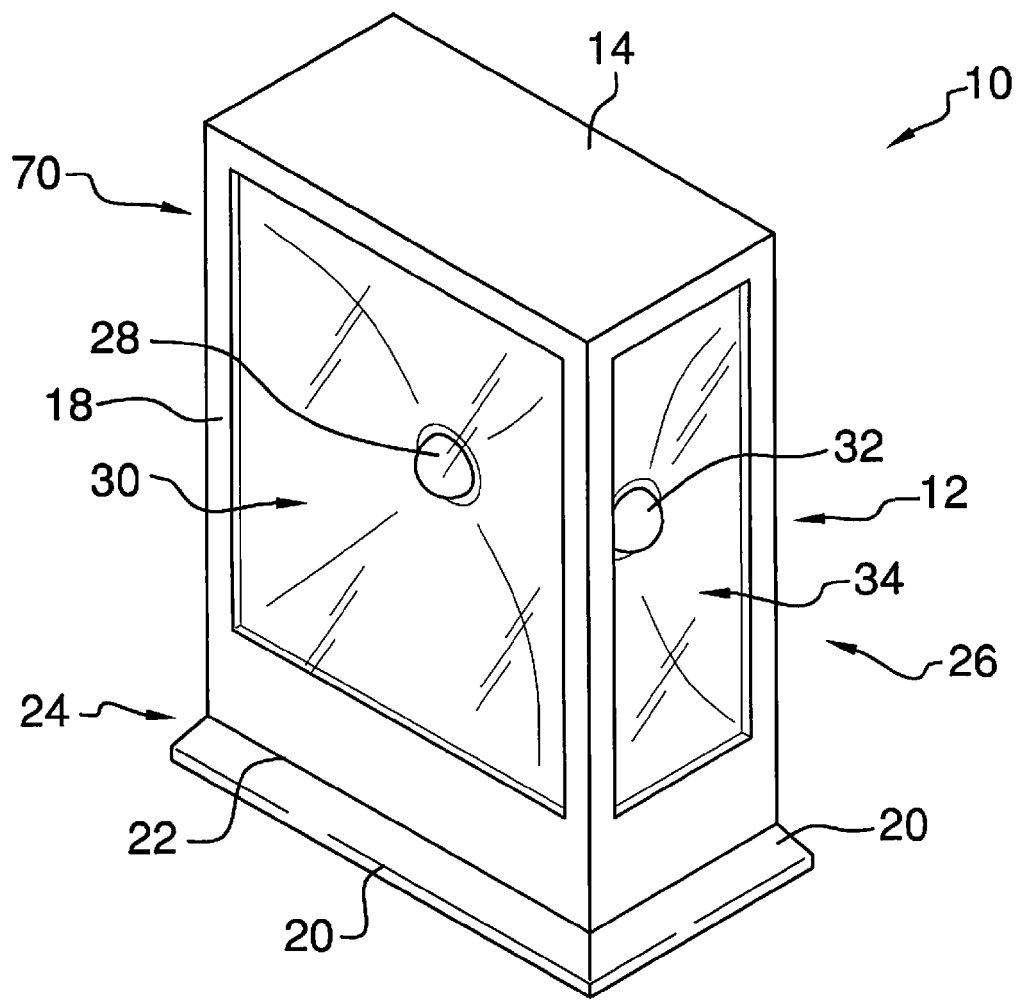
FIG. 1 is a top view of a vehicle safety light device according to an embodiment of the disclosure.
Figure 2:
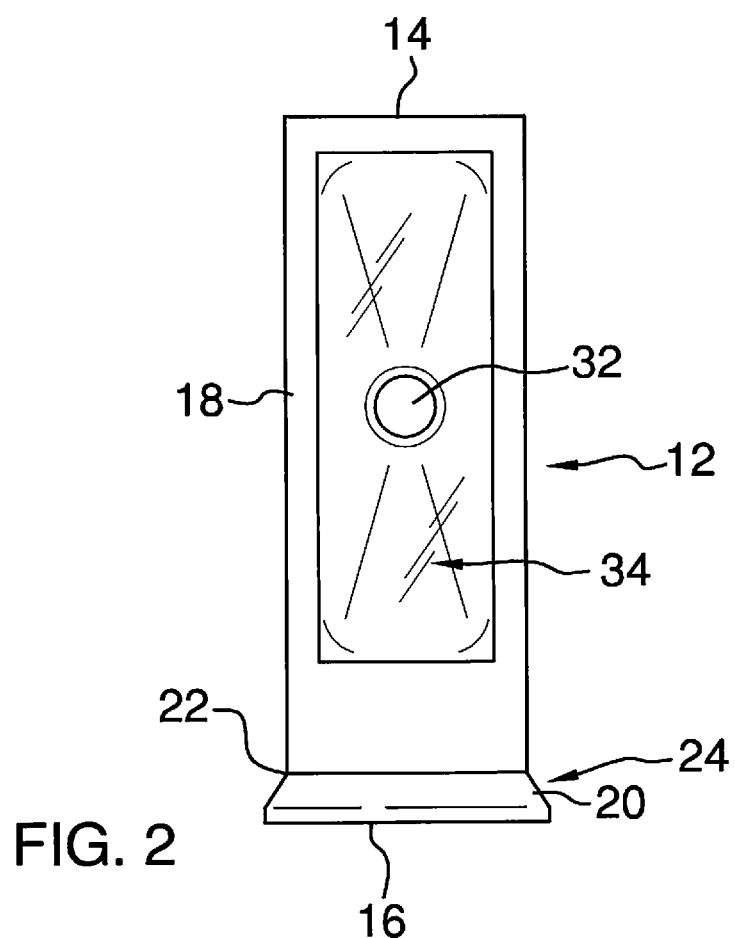
FIG. 2 is a top front side perspective view of a main housing of an embodiment of the disclosure.
Figure 3:
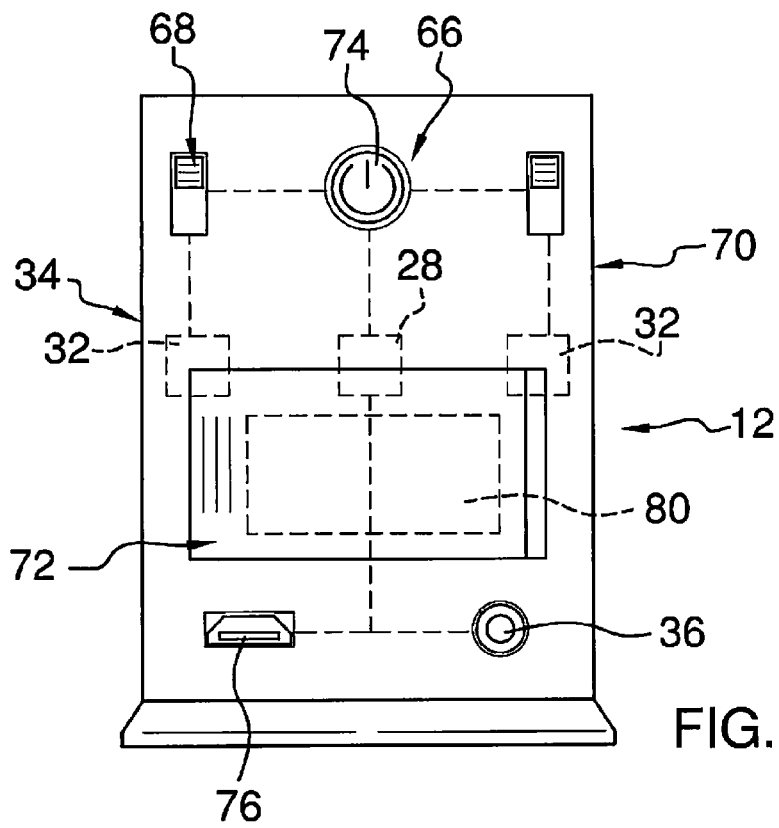
FIG. 3 is a side view of a main housing of an embodiment of the disclosure.
Figure 4:
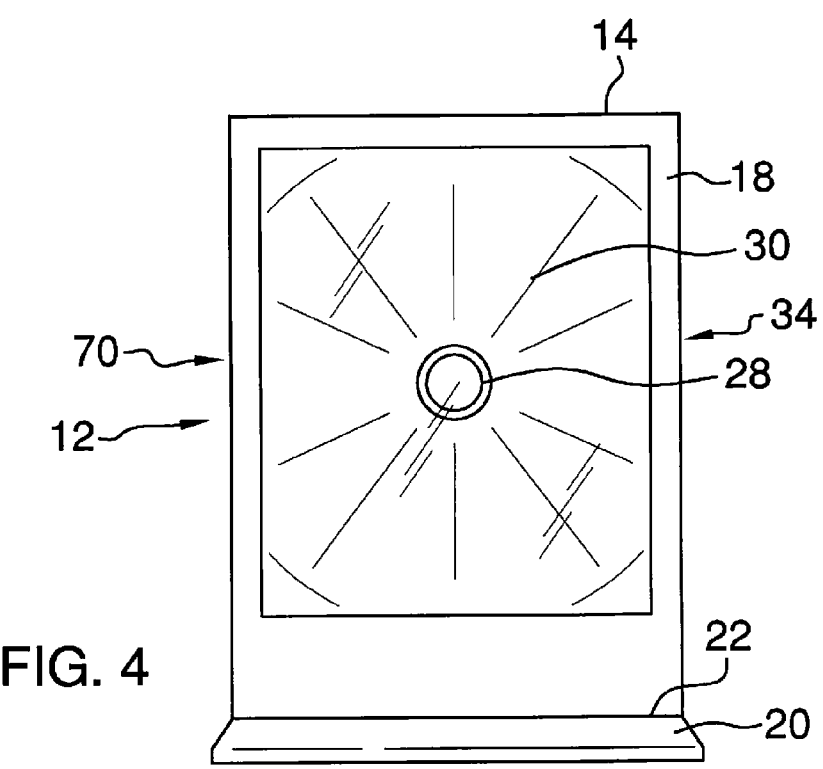
FIG. 4 is a back view of a main housing of an embodiment of the disclosure.
Figure 5:
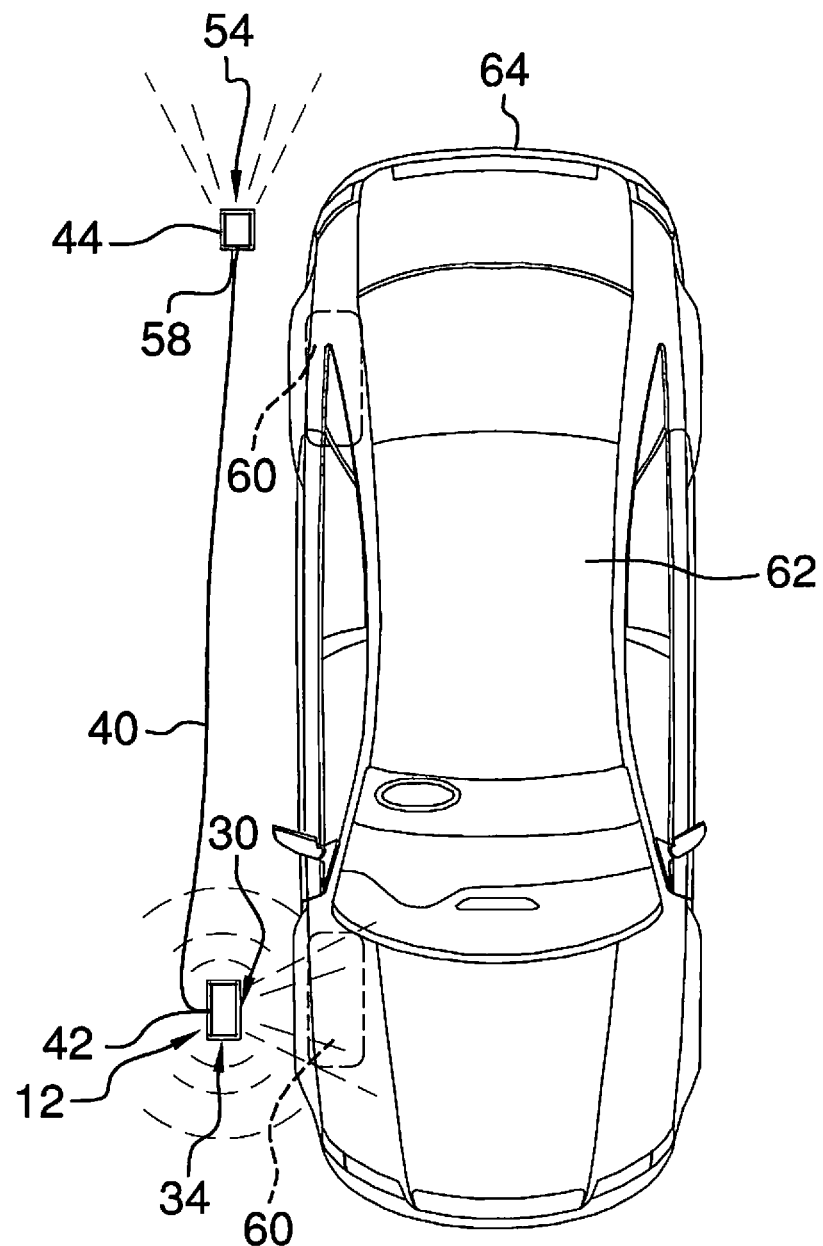
FIG. 5 is a front view of a main housing of an embodiment of the disclosure.
Figure 6:
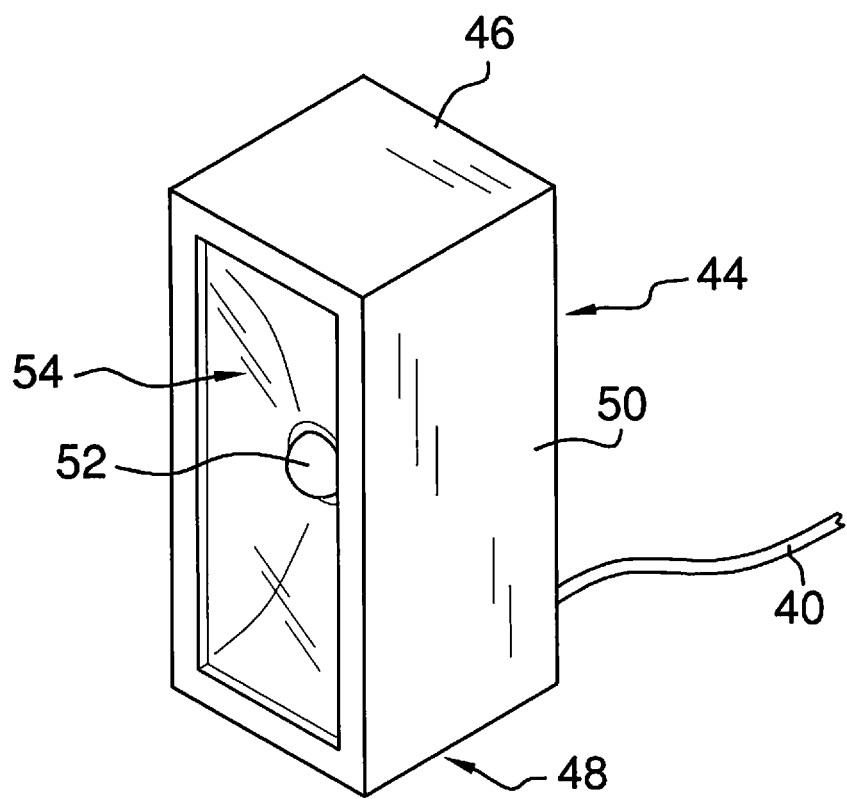
FIG. 6 is a top front side perspective view of a secondary housing of an embodiment of the disclosure.

With reference now to the drawings, and in particular to FIGS. 1 through 6 thereof, a new safety light device embodying the principles and concepts of an embodiment of the disclosure and generally designated by the reference numeral 10 will be described.

As best illustrated in FIGS. 1 through 6, the vehicle safety light device 10 generally comprises a main housing 12 having a top 14, a bottom 16, and a perimeter wall 18 extending between the top 14 of the main housing 12 and the bottom 16 of the main housing 12. A lip 20 extends from a bottom 22 of the perimeter wall 18 defining a broad base 24 wherein the base 24 is configured for supporting the main housing 12 in an upright position 26. A front light 28 is coupled to and exposed through a front face 30 of the perimeter wall 18 of the main housing 12. The front light 28 is selectively illuminated and produces a constant light. A side light 32 is coupled to and exposed through a side face 34 of the perimeter wall 18 of the main housing 12. The side light 32 is electrically coupled to the front light 28 wherein the side light 32 is selectively illuminated when the front light 28 is illuminated. The device 10 may also incorporate a similarly structured second side light on a second side face 70 of An electrical port 36 is coupled to a rear face 38 of the main housing 12. A cord 40 has a first end 42 selectively couplable to the electrical port 36 of the main housing 12. A secondary housing 44 has a top 46, a bottom 48, and a peripheral wall 50 coupled to and extending between the top 46 of the secondary housing 44 and the bottom 48 of the secondary housing 44. The main housing 12 may be larger than the secondary housing 44 to facilitate storage. A secondary light 52 is coupled to and exposed through a front face 54 of the secondary housing 44. The side light 32 and the secondary light 52 each flash when illuminated to draw attention and provide a warning. A second end 58 of the cord 40 is coupled to and extends from the secondary housing 44. The cord 40 is electrically coupled to the front light 28 wherein the secondary light 52 is selectively illuminated when the cord 40 is coupled to the electrical port 36 and the front light 28 is illuminated. The cord 40 has a length greater than the length of a conventional vehicle such that the cord 40 is configured for positioning the main housing 12 adjacent to a tire 60 on a vehicle 62 such that the front light 28 illuminates the tire 60 and the secondary housing 44 is positionable adjacent an opposite end 64 of the vehicle 62 from the tire 60 such that the secondary light 52 faces outwardly away from the vehicle 62 transverse to the direction of the tire 60.

A first switch 66 is electrically coupled to the front light 28 for selectively illuminating the front light 28. A second switch 68 is electrically coupled between the first light 28 and the side light 32 and the electrical port 36 wherein the side light 32 and the secondary light 52 are selectively illuminatable by manipulation of the second switch 68. A battery 80 is positioned in a battery compartment 72 of the main housing 12. The battery 80 is electrically coupled to each of the front light 28, the side light 32 and the electrical port 36. The first switch may be a main switch 74 coupled between the battery 70 and each of the front light 28, the side light 32 and the electrical port 36. An auxiliary port 76 may also be coupled to the housing allowing attachment and powering of another extrinsic electrical device. The auxiliary port 76 may be a universal serial bus type port.

In use, the main housing 12 and secondary housing 44 are positioned as desired to provide constant illumination to an area of the vehicle, such as a flat tire, by the front light 28, and flashing warning illumination to areas forward and rearward of the vehicle respectively by the side light 32 and the secondary light 52.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure.

I claim:

1. A vehicle safety light device comprising:
   a main housing having a top, a bottom, and a perimeter wall extending between said top of said main housing and said bottom of said main housing;
   a front light coupled to and exposed through a front face of said perimeter wall of said main housing, said front light being selectively illuminated;
   an electrical port coupled to a rear face of said main housing;
   a cord having a first end selectively couplable to said electrical port of said main housing;
   a secondary housing, said secondary housing having a top, a bottom, and a peripheral wall coupled to and extending between said top of said secondary housing and said bottom of said secondary housing;
   a secondary light coupled to and exposed through a front face of said secondary housing;
   a second end of said cord being coupled to and extending from said secondary housing, said cord being electrically coupled to said front light wherein said secondary light is illuminated when said cord is coupled to said electrical port and said front light is illuminated; and
   a side light coupled to and exposed through a side face of said perimeter wall of said main housing, said side light being electrically coupled to said front light wherein said side light is illuminated when said front light is illuminated.

2. The device of claim 1, further comprising a lip extending from a bottom of said perimeter wall defining a broad base wherein said base is configured for supporting said main housing in an upright position.

3. The device of claim 1, further comprising said main housing being larger than said secondary housing.

4. The device of claim 1, further comprising said front light being constant when illuminated and said side light and said secondary light each flashing when illuminated.

5. The device of claim 4, further comprising a first switch electrically coupled to said front light for selectively illuminating said front light.

6. The device of claim 5, further comprising a second switch, said second switch being electrically coupled between said first light and said side light and said electrical port wherein said side light and said secondary light are selectively illuminatable.

7. The device of claim 1, further comprising said cord having a length wherein said cord is configured for positioning said main housing adjacent to a tire on a vehicle such that said front light illuminates the tire and said secondary housing is positionable adjacent an opposite end of the vehicle from the tire such that said secondary light faces outwardly away from the vehicle transverse to the direction of the tire.

8. The device of claim 1, further comprising a battery positioned in a battery compartment of said main housing, said battery being electrically coupled to each of said front light, said side light and said electrical port.

9. The device of claim 8, further comprising a main switch coupled between said battery and each of said front light, said side light and said electrical port.

10. A vehicle safety light device comprising:
    a main housing having a top, a bottom, and a perimeter wall extending between said top of said main housing and said bottom of said main housing;
    a lip extending from a bottom of said perimeter wall defining a broad base wherein said base is configured for supporting said main housing in an upright position;
    a front light coupled to and exposed through a front face of said perimeter wall of said main housing, said front light being selectively illuminated;
    a side light coupled to and exposed through a side face of said perimeter wall of said main housing, said side light being electrically coupled to said front light wherein said side light is selectively illuminated when said front light is illuminated;
    an electrical port coupled to a rear face of said main housing;
    a cord having a first end selectively couplable to said electrical port of said main housing;
    a secondary housing, said secondary housing having a top, a bottom, and a peripheral wall coupled to and extending between said top of said secondary housing and said bottom of said secondary housing, said main housing being larger than said secondary housing;
    a secondary light coupled to and exposed through a front face of said secondary housing, said front light being constant when illuminated and said side light and said secondary light each flashing when illuminated;
    a second end of said cord being coupled to and extending from said secondary housing, said cord being electrically coupled to said front light wherein said secondary light is illuminated when said cord is coupled to said electrical port and said front light is illuminated, said cord having a length wherein said cord is configured for positioning said main housing adjacent to a tire on a vehicle such that said front light illuminates the tire and said secondary housing is positionable adjacent an opposite end of the vehicle from the tire such that said secondary light faces outwardly away from the vehicle transverse to the direction of the tire;
    a first switch electrically coupled to said front light for selectively illuminating said front light;
    a second switch, said second switch being electrically coupled between said first light and said side light and said electrical port wherein said side light and said secondary light are selectively illuminatable;
    a battery positioned in a battery compartment of said main housing, said battery being electrically coupled to each of said front light, said side light and said electrical port; and
    a main switch coupled between said battery and each of said front light, said side light and said electrical port.

* * * * *